Feb. 17, 1925.
C. H. RIEGEL
1,526,375
CLOSURE FOR SHEET METAL RECEPTACLES
Filed Feb. 28, 1924
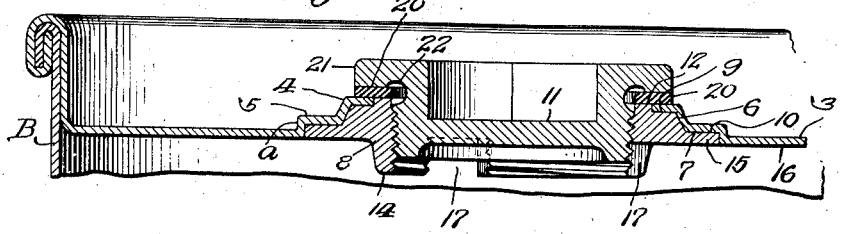
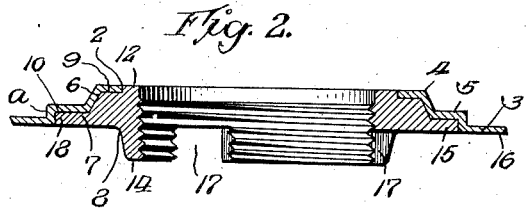
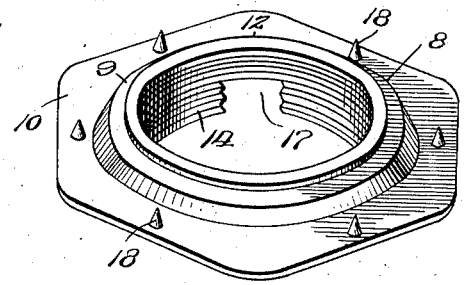
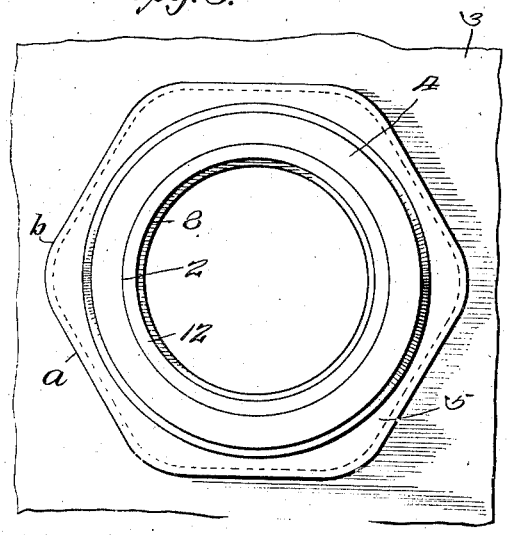
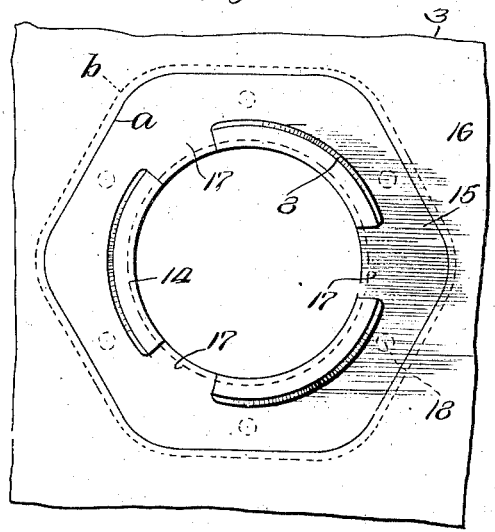
Inventor:
C. H. Riegel.
By Fisher, Moser and Moore
Attys.

Patented Feb. 17, 1925.

1,526,375

UNITED STATES PATENT OFFICE.

CLARENCE H. RIEGEL, OF NILES, OHIO.

CLOSURE FOR SHEET-METAL RECEPTACLES.

Application filed February 28, 1924. Serial No. 695,708.

*To all whom it may concern:*

Be it known that I, CLARENCE H. RIEGEL, a citizen of the United States, residing at Niles, in the county of Trumbull and State of Ohio, have invented certain new and useful Improvements in a Closure for Sheet-Metal Receptacles, of which the following is a specification.

The present invention relates to a closure for sheet-metal receptacles, and in general my object is to attach a bushing or collar in a particularly effective way to a relatively thin wall of the receptacle to provide an increased thickness of metal and a secure connection for a rotatable closure cap, bung, or screw-plug, with or without a gasket of rubber or other compressible sealing material at the joint. Thus my object involves a bushing or collar having a thin welding flange surrounding its central sealing and engaging portion, whereby a welded union may be made contiguous to, but apart from a raised seat for the sealing gasket without distorting the seat in welding operations, and the flanged collar is nested within a stepped recess within the wall substantially flush with the plane surface of said wall interiorly of the receptacle and notched at its thicker central body portion to promote full and complete drainage of the receptacle when the bung or plug is removed and the receptacle tilted or inverted. The flange of the collar is made thin to promote electrical welding thereof to the thin sheet metal wall, and the stepped recess and collar are made angular in part where nested to relieve and protect the welded union against the torsional strains imposed upon the thin metal portions when the screw-plug or cap is rotated, especially during removal.

In the accompanying drawings, Fig. 1 is a sectional view of a portion of the head of a sheet-metal drum, cask or barrel having a screw-collar welded thereto according to my invention, a screw-plug being also shown connected to the collar. Fig. 2 is a sectional view of the screw-threaded collar nested within and welded to a sheet metal wall, without the screw-plug. Fig. 3 is a bottom view of the collar and fragment of wall shown in Fig. 3. Fig. 4 is a top view of the collar and the fragmentary part of sheet-metal having the round opening and stepped angular recess, the metal being partly broken away to disclose one of the spot welds and the angular formation of the thin wall and flange opposite the spot weld. Fig. 5 is a perspective view of the flanged collar as it appears before it is introduced into the angular recess and welded to the wall.

The present closure device has been expressly devised to permit its production and incorporation in a sheet metal receptacle in an economical and facile way by the use of known electrical welding methods and machines. I prefer to use electric pressure welding methods but do not wish to limit myself to such particular methods of welding as other welding steps or methods may possibly be used advantageously, following the teachings of the present disclosures. Thus, an opening 2 of a predetermined diameter is first formed in the sheet-metal wall 3 of a receptacle, such as a drum, cask or barrel adapted to hold and store a fluid or liquid of any kind, or in a receptacle where it is desired to have a fluid tight or hermetically sealed filling opening or dispensing outlet. As shown, the closure device is applied to the head of a cask or barrel B, but it may be incorporated instead within the side wall or body of the barrel. In either case the sheet-metal is pressed or stamped outwardly in stepped fashion to provide a raised flat round tapering boss or protuberance 4 surrounding the opening 2 and also a slightly raised annular offset 5 of larger diameter at the base of said boss or protuberance 4, thereby producing a round and relatively deep flaring recess or cavity 6 within the boss 4 adjacent opening 2 and a second shallow recess or cavity 7 of larger diameter within the annular offset 5 remote from opening 2 and the flat top of boss 4. The shallow depression or recess 7 is preferably polygonal or of angular outline or flat sided, the thin metal wall being pressed outwardly to form a right-angular shoulder *a* the full depth of said recess. The angularly related straight sides of the recess are connected by wide sweeping curves or rounded corners *b* to permit the depression to be formed without general shape of a square, hexagonal or octagonal figure.

I also provide a wrought-iron, steel or cast metal annular or ring-shaped re-enforcing collar 8 having stepped surfaces 9 and 10 conforming closely in shape to the annular walls of the two recesses 6 and 7 respectively, so as to fit snugly therein when this collar is welded to the wall eventually. The central round opening within this collar is adapted to receive a screw-threaded cap, plug or bung 11, the main body of the collar being screw-threaded substantially its full depth for that purpose. The upper or outer end of the body is extended slightly above the top ledge or stepped surface 9 to provide an annular centering rib 12 adapted to enter and fit the round opening 2 in wall 3. The inner end of the main body of collar 8 is in the form of a flange 14 of reduced diameter which extends downwardly beneath the flat bottom of the relatively thin laterally-extending base flange 15 which provides the first stepped surface 10. When flange 15 is seated fully within the shallow recess 7 the bottom face of the flange is substantially flush with the inner face 16 of wall 3, and therefore in order that all the liquid in the cask or barrel may be emptied or drained freely therefrom I form slots, gaps or open spaces 17 within the round depending extension or flange 14.

The lateral base flange 10 is relatively thin and of the same angular formation at its edges as recess 7, and the upper surface 10 thereof is provided with a series of pointed projections 18 at uniformly spaced intervals radially of the collar, preferably adjacent the straight sides midway between the rounded corners. It is at these isolated points or places that welding occurs when collar 8 is placed within the recesses 6 and 7 in wall 3 and the pointed projections 18 engage the inner or bottom face of the annular offset 5. Welding may be produced by pressure and an electric welding current applied to these parts by means of suitable electrodes, the plate 3 and the collar being only welded together at the spots or points 18; consequently the welding heat is localized at spaced intervals in the base offset 5 and the thin base flange 15 at points remote from the raised step 9 and the top of boss 4, and no distortion or malformation of the metal occurs at such elevated places, thereby leaving a perfectly flat plane top surface for a sealing gasket 20 to seat upon. A screw plug 11 having a lateral flange 21 is customarily employed with gasket 20 to effect a fluid-tight joint, and if desired the bottom face of flange 21 may be channeled, beveled or undercut at 22 opposite the centering rib 12 on collar 8 to localize the compression upon the gasket opposite the top surface 4 of wall 3. This latter feature, and the forming of a hermetical seal by compressing a gasket between a flanged cap or screw plug and the top or outer surface of the wall or body of a thin sheet metal container or receptacle re-enforced by a collar upon the inside of the container is not claimed herein as new and novel in view of the disclosures in prior Letters Patent of the United States, No. 14,439 to C. Branwhite, 1856, for a hermetically sealing preserve can. But by reference to the foregoing description it will be seen that the present closure device differs therefrom in several important respects to facilitate its manufacture and to permit its use safely and continuously with large and heavy shipping containers. Thus, the lateral flange on the collar may be made relatively thin to permit a spot welded union to be made with the sheet metal wall of the container without distorting the gasket seating surface, while the angular-sided depression 7 and correspondingly shaped flange 15 prevent the collar from turning and the spot welded places from tearing when a torsional strain is applied to the screw plug in rotating the same with a wrench.

What I do claim, however, as new and useful in this art, is:

A receptacle having a sheet-metal wall formed with offset concentric bosses and recesses, the inner boss having an opening and the outer boss and recess being of polygonal shape, a re-enforcing ring having a thin flange of polygonal shape seated wholly within said bosses flush with the inner side of said wall and fitting said polygonal recess, said ring being provided with a screw-threaded extension at its bottom having lateral drainage openings, in combination with a screw-threaded closure member adapted to enter said opening and to be connected to said ring.

In testimony whereof I affix my signature.

CLARENCE H. RIEGEL.